United States Patent
Rogus

[11] Patent Number: 5,441,458
[45] Date of Patent: Aug. 15, 1995

[54] GROOVED ROLLER CHAIN IDLER

[76] Inventor: Thomas E. Rogus, Rt. 2 Box 99, Strandquist, Minn. 56758

[21] Appl. No.: 182,752

[22] Filed: Jan. 14, 1994

[51] Int. Cl.⁶ .............................................. F16H 55/36
[52] U.S. Cl. ...................... 474/189; 474/197; 198/826
[58] Field of Search .................. 474/131, 136–138, 474/132, 152, 155, 159–161, 166; 474/139, 189, 197; 198/826

[56] References Cited

U.S. PATENT DOCUMENTS

| | | | |
|---|---|---|---|
| 772,968 | 10/1904 | Smith | 198/826 |
| 1,442,899 | 1/1923 | Neenan | |
| 2,688,394 | 9/1954 | Hurd et al. | 198/826 X |
| 2,701,971 | 2/1955 | Carter et al. | 474/192 |
| 2,820,541 | 1/1958 | Barnish et al. | 198/826 X |
| 3,033,352 | 5/1962 | Kain | 198/826 |
| 3,089,580 | 5/1963 | Dilgard | 198/826 X |
| 3,092,240 | 6/1963 | Tyler et al. | 198/826 |
| 3,200,665 | 8/1965 | Wells | 474/161 X |
| 3,257,860 | 6/1966 | Runde et al. | 474/161 X |
| 3,294,218 | 12/1966 | Chantland | 198/826 |
| 3,325,026 | 6/1967 | Benedick | 474/139 X |
| 3,362,523 | 1/1968 | Stone | 198/826 |
| 3,605,513 | 9/1971 | Sugimoto | 474/161 X |
| 3,666,322 | 5/1972 | Pickron | 474/161 X |
| 3,985,038 | 10/1976 | Fowler | 474/136 |
| 4,078,445 | 3/1978 | Kiser | 474/161 X |
| 4,144,773 | 3/1979 | Addicks | 474/161 |
| 5,000,724 | 3/1991 | Reid | 474/111 |
| 5,098,346 | 3/1992 | Redmond | 474/161 |
| 5,224,903 | 7/1993 | Langhof et al. | 474/161 X |
| 5,244,439 | 9/1993 | Rogus | 474/136 |

Primary Examiner—Roger J. Schoeppel
Attorney, Agent, or Firm—Vidas, Arrett & Steinkraus

[57] ABSTRACT

An idler roller 40 replaces idler sprockets in roller chain 20 applications to reduce wear on the system components. The roller chain side bars 24, 26 rest in parallel alignment grooves 50, 52 in the non-resilient idler 40. In a second form, the outer circumference is still rigid, but includes a resilient dampening layer thereunder.

1 Claim, 1 Drawing Sheet

U.S. Patent  Aug. 15, 1995  5,441,458
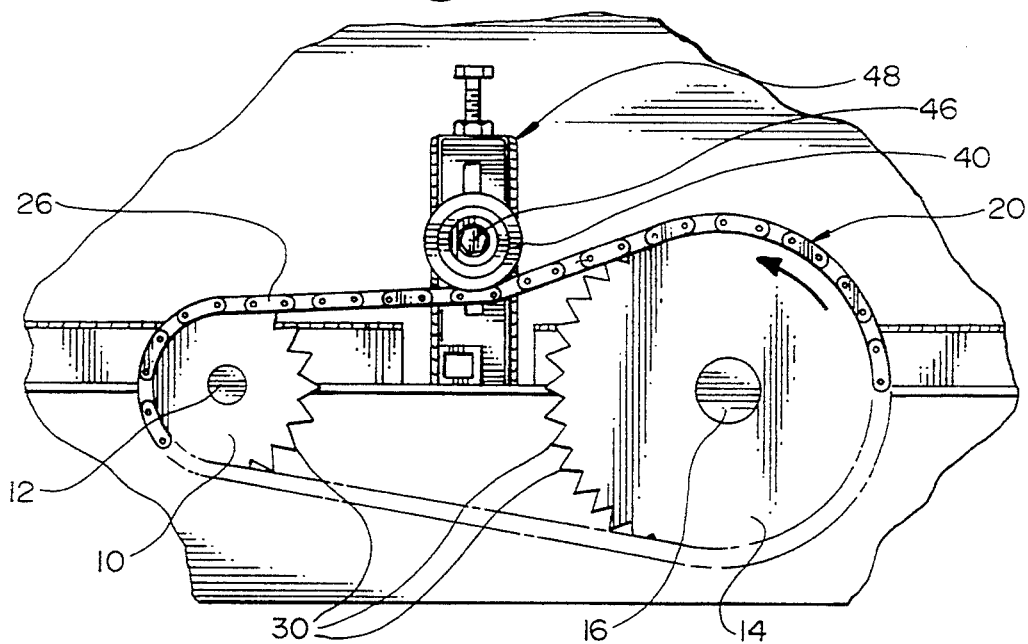
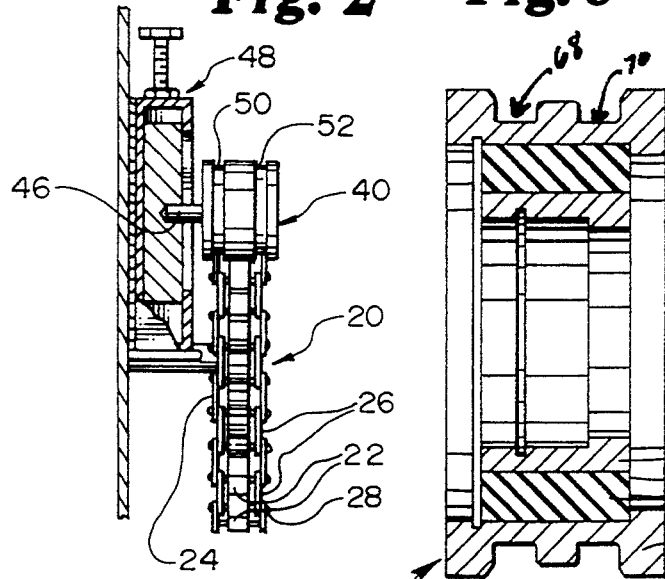
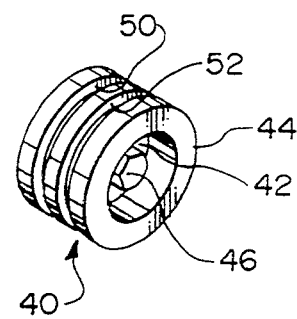
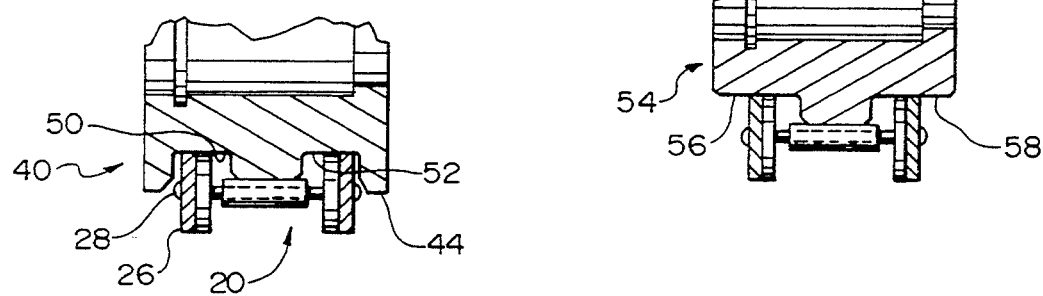

GROOVED ROLLER CHAIN IDLER

BACKGROUND OF THE INVENTION

1. Field of the Invention

This invention relates to a grooved metal idler to replace pressure side idlers on roller chain assemblies.

2. Description of the Related Art

In many applications, roller chain is used to transmit power from a drive sprocket to a driven sprocket. These sprockets each include teeth that mesh with the spaces between rollers on the roller chain.

A chain idler is usually a part of the system to provide the tension desired in the roller chain. In theory, the idler is adjusted until the roller chain is as taut as desired. Unfortunately, a variety of imperfections result in run-out that causes the chain to whip and lash, increasing wear and noise.

Variance may be found in the chain link itself, in the drive, drive and idler sprockets, any of the three shafts or any of the sprocket teeth. Also, the shaft bearings also contribute to run-out.

Total indicator run (ITR) is the amount of run out from a high to a low point for each component. The individual value can easily be as high as 0.010" (0.025 cm). The composite of all ITR's can be much higher.

Since each component has its own 'high' and 'low', it may take many revolutions before all 'highs' or all 'lows' line up. This variance means that an idler is usually adjusted so the chain is normally slack, and only tight at the highest runout point. Otherwise, the chain would be normally snug, but occasionally too tight when the maximums were reached. This looseness causes more noise, decreases chain life and causes wear on all components.

Whenever chain flexes it wears. Most wear occurs on the slack side of the drive. The idler of the invention maintains tension holding the chain in a straight line which reduces wear.

SUMMARY OF THE INVENTION

The invention provides an amazingly simple solution to this problem. It employs a grooved roller instead of a toothed-sprocket idler. The grooved roller is formed from rigid, durable material such as steel. The rollers of the roller chain contact the central ridge of the metal idler and the bottom of the side bars of the chain do not touch the idler.

BRIEF DESCRIPTION OF THE DRAWINGS

A detailed description of the invention is hereafter described with specific reference being made to the drawings in which:

FIG. 1 is a side view of a typical assembly of the roller chain, drive and driven sprockets and the inventive idler roller;

FIG. 2 is a side view of the roller of FIG. 1 showing the two grooves formed;

FIG. 3 is a perspective view of the idler of the invention showing the spaced side bar grooves;

FIG. 4 shows the chain roller in contact with the idler and the side bars within said grooves;

FIG. 5 shows a variant in which the idler has no outer guide ridges; and

FIG. 6 shows a variant in which the core of the device may include rubber, with the periphery being metal.

DESCRIPTION OF THE PREFERRED EMBODIMENTS

With reference to the Figures, it will be seen that a typical power assembly includes a drive sprocket 10, drive shaft 12, driven sprocket 14, driven shaft 16 and a roller chain 20. The chain 20 is composed of individual links with adjoining rollers 22. The side bars 24, 26 of the individual links extended further out than the roller 22 diameter. The side bars and rollers are usually held together by pins 28. The spacing between the rollers 22 is selected to match the distance between teeth 30 of the sprockets.

The roller idlers 40 of the invention are exceedingly simple. They are rigid non-resilient rollers of the type used in conveyer belts and the like which have been modified to include two spaced grooves. In the simplest form, they include a metal journal 42 which includes two spaced grooves 50, 52 to form a complete tightener 40. The grooves are between outer guide ridges 44 and a central ridge 60. The grooves help to guide the chain by confining the side bars, which do not contact the idler roller. Only the chain rollers 22 contact the idler roller 40. In more elaborate forms, they can include bearings.

Instead of spaced grooves, an idler 54 may be machined to define a central ridge 60 between flats 56, 58 on which the rollers 22 rest. In this form shown in FIG. 5, the roller 22 rests on central ridge 60 and can accept greater widths of chain, since no outer guide ridges 44 are present.

The idler 40 is positioned on the pressure side of chain 20. The chain is centered on the idler, usually in the same position as an original sprocket idler.

Tension is placed on the idler 40. Adjustment is made through a tensioner mechanism 48. Basically, the shaft 46 of the idler 40 is slid along the tensioner mechanism 48 causing more or less tension against the chain. The heavy roller chains take higher tensioning. The side bars 24, 26 of the chain 20 rest in grooves 50, 52 of the idler 40. The rollers 22 rest on the central ridge 60 of the idler 40. On the pressure side, the idlers are under considerable pressure and must be constructed of rigid, durable material, preferably steel.

Periodic retensioning as the roller chain wears decreases any whipping and flexing of the chain. The idler 40 is independent of chain pitch.

The idler 40 contacts the rollers 22 at the periphery of the central ridge 60 and not the bottom edge 62 of the side bars. The contact formed prevents the rollers 22 from spinning as they do when engaged with idler sprockets. This reduces wear to the rollers 22 of the chain 20.

The entire system may pull easier since change in pitch caused by chain wear does not effect engagement and disengagement of the roller chain which happens with idler sprockets.

The idlers 40 also eliminate chain roller 22 spin, which is also a wear factor in prior systems.

FIG. 6 shows a form of the invention in which the periphery that comes in contact with the chain is metal, but the remainder of the device may include rubber or other non-rigid materials. In the form shown, idler roller 64 with a rubber mount is shown. It includes a rigid, preferably metal periphery 66 which may include two grooves, 68, 70. A molded rubber section 72 is between the periphery 66 and a metal, preferably steel blank 74. The device may be completed by inserting a bearing with journal (not shown) into the bearing housing defined by the steel blank 74.

The device of FIG. 6 has the advantages of the other forms of the invention and additionally absorbs shock, decreases noise and maintains tension which provides longer bearing life.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. An idler roller comprising a central axis about which a rigid non-resilient material is arranged, the rigid material defining a rigid idler roller having a smooth outer circular circumference, the outer circumference of said rigid idler roller including a pair of spaced circumferential grooves in the rigid material, said rigid material being steel and describing a circular steel circumference, said idler roller including a layer of resilient rubber underneath said steel circumference.

* * * * *